United States Patent [19]
Olomski et al.

[11] Patent Number: 5,287,049
[45] Date of Patent: Feb. 15, 1994

[54] METHOD FOR TRIGGERING SWITCHING OPERATIONS RELATED TO POSITION DURING A MACHINING PROCESS CARRIED OUT BY A ROBOT OR A MACHINE TOOL

[75] Inventors: Jürgen Olomski, Herzogenaurach; Manfred Zäh, Forchheim; Christof Meier, Heroldsbach; Norbert Settele, Petersdorf/Willprechtszell, all of Fed. Rep. of Germany

[73] Assignee: Siemens Aktiengesellschaft, Munich, Fed. Rep. of Germany

[21] Appl. No.: 937,811

[22] Filed: Aug. 31, 1992

[30] Foreign Application Priority Data

Sep. 6, 1991 [EP] European Pat. Off. ........ 91115101.7

[51] Int. Cl.$^5$ .................... G05B 19/42; G06F 15/46
[52] U.S. Cl. .................. 318/568.1; 318/573; 318/574; 364/192; 364/474.22
[58] Field of Search ............... 318/560–646; 364/474.01–474.34, 167–171; 901/3, 7, 9, 15, 16–23, 2

[56] References Cited

U.S. PATENT DOCUMENTS

| | | | |
|---|---|---|---|
| 4,529,921 | 7/1985 | Moribe | 318/567 X |
| 4,663,726 | 5/1987 | Chand et al. | 318/573 X |
| 4,675,502 | 6/1987 | Haefner et al. | 318/574 X |
| 4,683,543 | 7/1987 | Hirasawa et al. | 318/573 X |
| 4,689,756 | 8/1987 | Koyama et al. | 318/573 X |
| 4,879,663 | 11/1989 | Fuehrer | 318/573 X |
| 4,903,213 | 2/1990 | Buhler et al. | 318/573 X |
| 4,914,363 | 4/1990 | Stelzer et al. | 318/568.1 |
| 5,003,237 | 3/1991 | Kimura | 318/572 |
| 5,028,855 | 7/1991 | Distler et al. | 318/568.13 |
| 5,140,236 | 8/1992 | Kawamura et al. | 318/568.1 |
| 5,144,550 | 9/1992 | Sasaki et al. | 364/192 |

FOREIGN PATENT DOCUMENTS 4101422 7/1991 Fed. Rep. of Germany.

OTHER PUBLICATIONS

Patent Abstracts of Japan, vol. 9, No. 250 (1973), Oct. 8, 1985 & JP-A-60 101 606 (Hitachi) Jun. 5, 1985.

*Primary Examiner*—Paul Ip
*Attorney, Agent, or Firm*—Kenyon & Kenyon

[57] ABSTRACT

A one-dimensional, actual-value-specific path parameter $F_I(t)$ is derived from a motional function $F_B(t)$ to trigger switching functions related to position during the movement along a trajectory path of a numerically controlled system, for example a robot or a machine tool. This allows triggering of a switching operation such as switching on a welding or bonding tool with high precision at the actual position of the tool.

11 Claims, 3 Drawing Sheets

METHOD FOR TRIGGERING SWITCHING OPERATIONS RELATED TO POSITION DURING A MACHINING PROCESS CARRIED OUT BY A ROBOT OR A MACHINE TOOL

BACKGROUND OF THE INVENTION

When workpieces are machined by a robot, a complex machine tool or a machining center, it is necessary to carry out, among other things, switching operations related to movement. Such switching operations can include, for instance, closing or opening an electrode holder used in spot welding, switching the welding current on and off when an electric arc or laser is used in contour welding, or connecting or disconnecting the bulk current of a tool such as a glue gun, etc. for bonding and sealing work. These switching operations are carried out at certain positions on the trajectory path completed by the tool. The term "position" refers not only to the spatial point where a tool is situated, but also to the alignment of the tool at this spatial point. In the case of a robot, this alignment is usually referred to as the "orientation" thereof.

When the trajectory for the tool of the robot, of the machine tool, or of some other numerically controlled system is specified exactly by coordinate values, for example by Cartesian coordinates, the position where the switching operation is supposed to be initiated can also be specified in these coordinates. However, it is cumbersome to enter coordinate values as setpoint values, since several values are always required. A far more serious disadvantage of this method for triggering switching operations lies, however, in that numerically controlled systems are provided with several possibilities for generating a path between two points. In addition to the already mentioned coordinate-specific movement along a trajectory path, described as continuous-path (CP) movement, there could be, for example, a point-to-point (PTP) and/or a looping (UE) movement. In the case of point-to-point movement, the axes of the numerically controlled system are travelled in a way which allows the target point to be approached with the smallest angle change for each axis. Therefore, the path between two points of a point-to-point movement along a path completed by the tool is, first of all, not necessarily a straight line, and secondly, is not known in coordinates. In this case as well, no switching operation can be initiated in response to a specific coordinate value. The same applies to looping movements along a path, in which case individual motion blocks are interconnected by a looping contour in such a way that the movements of the tool from one motion block to the other blend continuously into one another.

Another difficulty in establishing a defined switching point lies in that the actual values of the tool position of the numerically controlled system differ by a following error value from the setpoint values calculated by the numerical control. This following error value increases as the tool path feedrate increases.

SUMMARY OF THE INVENTION

The present invention relates to a method for triggering switching operations during a machining process carried out by a robot or a machine tool which enables a defined triggering of the switching operation for all traversing movements.

A method according to the present invention for triggering switching operations during a machining process carried out by a robot or a machine tool includes calculating setpoint values of the travel components from at least one motional function by the numerical control for each travel section. A path parameter which is specific to an actual value and whose value rises or falls monotonically with the current position of the tool from the starting position to the end position of the specific travel section is derived from the setpoint values of one motional function. The switching operation is triggered via the numerical control when the path parameter has reached a specifiable actual value.

Such a path parameter related to actual value could be a function of time, for example. This function for each travel section is advantageously proportional to the path displacement so that the switching operation is carried out at the same position independently of the feedrate. It is, furthermore, advantageous when the path parameter is only one-dimensional and when it is displayed during the operation of the robot or the machine tool. The user can then read off the particular path parameter at the desired point of the taught tool position and enter it into the numerical control for the scheduled operation. It is particularly advantageous when the path parameter at the taught point can be retrieved directly into the robot control for the scheduled operation by releasing a signal, for example by depressing a button.

According to an advantageous embodiment of the present invention, the switching operation can be triggered at a specifiable period of time before or after the stipulated actual value of the path parameter is reached. This provides a solution for the case in which the switching operation is supposed to be triggered before the actual switching position (or rather the machining position) is reached. This is the case, for example, when a glue gun is used as a tool that requires a certain heat-up time to liquefy the adhesive agent or a certain advance movement to enable the adhesive agent to emerge precisely at the glue tip when the adhering operation is supposed to be carried out.

According to another particularly advantageous embodiment of the present invention, a setpoint path parameter is derived from a motional function of a travel section. One particular travel section is scaled so that the setpoint path parameter can be used as a comparison for various travel sections.

Motional functions $F_B$ are described as internal control functions, which determine the progression of motions, and thus also of feedrate. Thus, in the case of CP movements, for example, the translational path and the orientation can be derived from separate motional functions $F_B$, or also from one single, properly scaled motional function $F_B$.

In the case of PTP movements, the axial setpoint values can be derived from a scaled motional function, or when the axial setpoint value changes are not proportional to one another, a separate motional function is calculated for each axis. This depends on the specific embodiment of the control. Thus, each motional control, which generates continuous setpoint values, determines one or more motional functions, unscaled or scaled, for each type of movement. Therefore, each motional function represents a function of time, which can be applied directly or with separate scaling as a path parameter. The motional function selected for the path parameter is advantageously scaled so as to allow the path parameter to serve as a comparison for all travel sections.

If a movement is calculated from several motional functions $F_B$, then one advantageously applies the function that defines travel time. The actual value of the path parameter (also described as the actual path parameter) is able to be determined simply from the difference between the setpoint value of the path parameter (also described as the setpoint path parameter) and a differential value between the actual and setpoint path parameter, which is obtained from the derivation of the setpoint path parameter as a function of time, multiplied by the resulting angular differential of one axis, divided by the setpoint angular velocity (or feedrate) of this axis.

BRIEF DESCRIPTION OF THE DRAWINGS

Other details and advantages of the present invention will become apparent from the following description taken in conjunction with the accompanying drawings, wherein.

DETAILED DESCRIPTION

Figure 1:
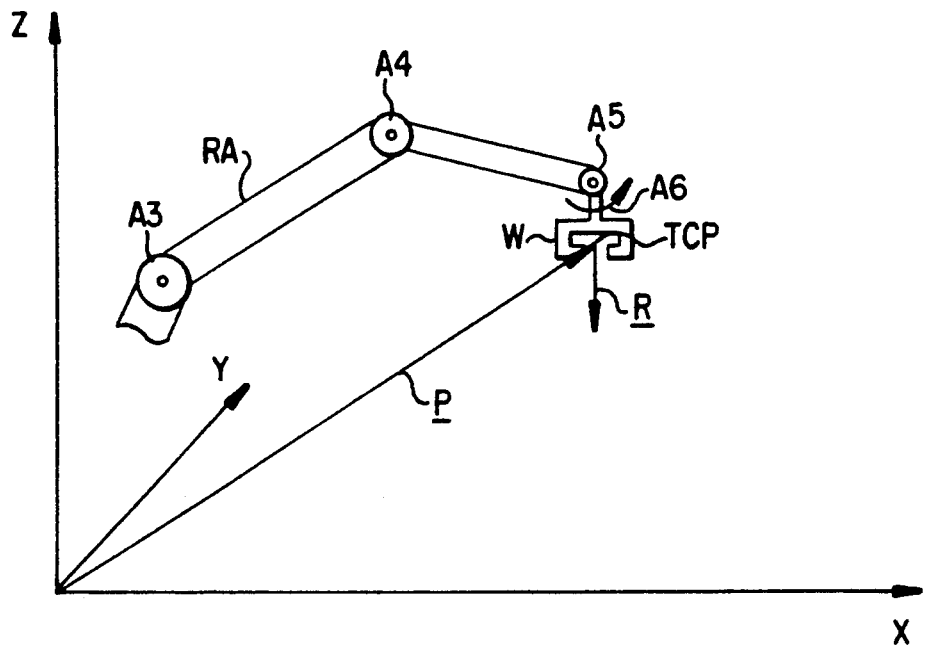
FIG. 1 illustrates a section of a robot arm in a Cartesian coordinate system.

FIG. 1 illustrates a portion of a robot arm including axes A3, A4, A5 and A6 and a tool W. The access point of the tool W is described as the tool center point TCP. The coordinates of the tool center point TCP are indicated by the vectors $\underline{P}$ and $\underline{R}$. The actual spatial point in the Cartesian coordinate system (or in any other coordinate system) is indicated by the vector $\underline{P}$. The vector $\underline{R}$ characterizes the orientation of the robot tool W. Thus, the position of the tool center point TCP is able to be described by a vector $\underline{X}$, which includes the Cartesian coordinates X, Y, Z and the orientation angle A, B, C of the robot tool W which is not shown but is inherently known to one of ordinary skill in the art.

$$\underline{X} = (X, Y, Z, A, B, C)^T$$

In the case of CP movements, X, Y, Z, A, B, C each represent a travel component.

Figure 2:
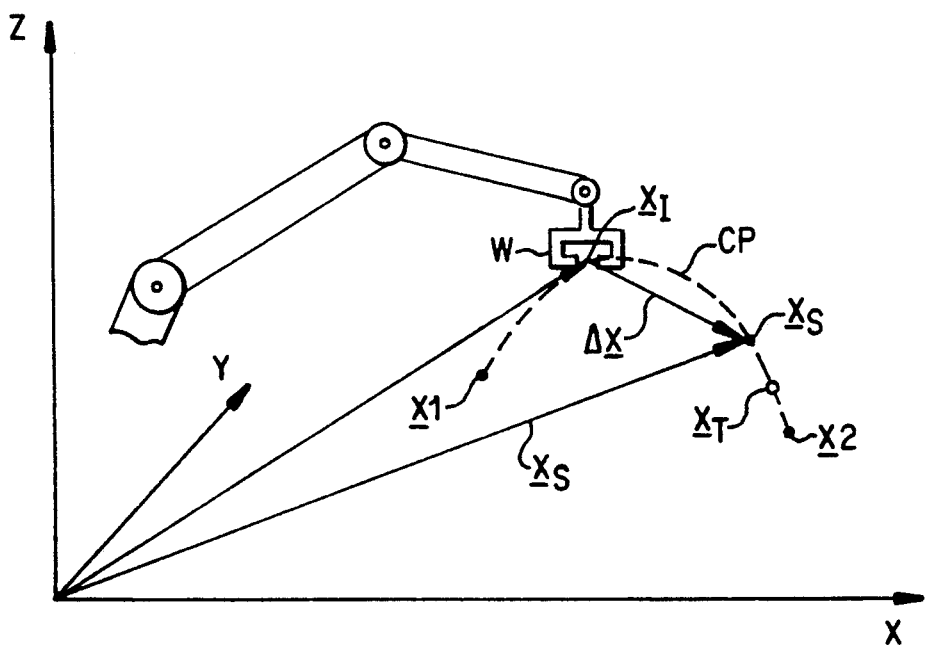
FIG. 2 illustrates a robot arm which moves along a path curve.

FIG. 2 illustrates a travel section of a path curve on which the tool center point TCP is supposed to move from position $\underline{X1}$ to position $\underline{X2}$; it is, therefore, a question of a Cartesian, or rather a continuous-path travel section. This means that for each interpolation position calculated by the numerical control, the Cartesian coordinates, the orientation of the tool W and thus the vector $\underline{X}$ are known.

A switching operation is supposed to be triggered at the bonding position $\underline{X}_T$ of the travel section CP which is identified by a small circle in FIG. 2. The switching operation could relate to, for example, application of adhesive material by means of a glue gun mounted on the robot's hand. For this purpose, one could, in fact, apply the setpoint value $\underline{X}_S$ calculated and output by the numerical control. Since, however, the real actual value $\underline{X}_I$ is dependent on the feedrate at which the tool W is moved along the travel section from position $\underline{X1}$ to position $\underline{X2}$, and thus deviates by a larger or smaller value $\Delta \underline{X}$ from the setpoint position $\underline{X}_S$, the actual switching operation would be triggered before the bonding position $\underline{X}_T$ is reached.

However, as indicated in FIG. 2, the positional actual value $\underline{X}_I$ of the robot tool W may remain within one travel section CP behind the positional setpoint value $\underline{X}_S$. The positional actual value $\underline{X}_I$ may also lie behind the positional setpoint value $\underline{X}_T$ by several travel sections. This situation is clarified in greater detail based on the following description in view of FIG. 3.

Figure 3:
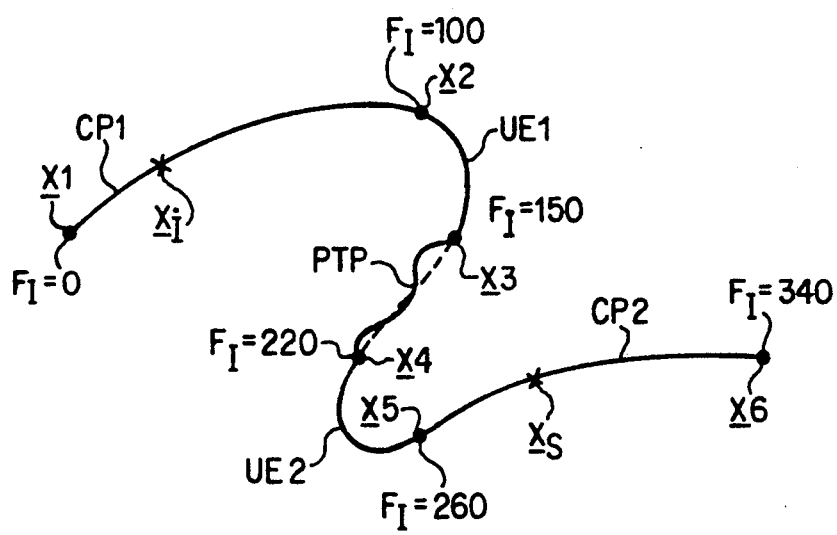
FIG. 3 illustrates a path curve consisting of several combined travel sections.

FIG. 3 illustrates the side-by-side arrangement of several travel sections CP1, UE1, PTP, UE2, CP2 between positions $\underline{X1}$ to $\underline{X6}$. The travel sections CP1 and CP2 respectively between positions $\underline{X1}$ and $\underline{X2}$ and between $\underline{X5}$ and $\underline{X6}$ are Cartesian or continuous-path (CP) path sections. In these travel sections, the Cartesian coordinates of the robot tool, or rather of the tool center point TCP, are known for each interpolation clock cycle. The travel sections UE1 and UE2 between the positions $\underline{X2}$ and $\underline{X3}$ or $\underline{X4}$ and $\underline{X5}$ are looping travel sections, which continuously interconnect the travel sections CP1 and PTP or PTP and CP2. In these travel sections, the Cartesian coordinates of the tool center point are not known, since the intention is merely to achieve an optimal looping between two travel sections.

The Cartesian coordinates on the path between the mentioned positions are also not known in the travel section PTP between positions $\underline{X3}$ and $\underline{X4}$. An optimal control in the robot's coordinate system is the main consideration for this point-to-point movement. That is, the axes are travelled so as to allow point $\underline{X4}$ to be reached from point $\underline{X3}$ on the path that is the shortest for the axial angular positions. As a rule, therefore, the shortest connection between positions $\underline{X3}$ and $\underline{X4}$ which is drawn with a dotted line in FIG. 3 is not followed for the travel section PTP. Rather, the robot tool travels a path such as the curved path PTP drawn with a solid line in FIG. 3. Accordingly, the operation that is executed for the loop section UE1 and the travel section CP1 applies to the loop travel section UE2 and the travel section PT2.

In the case of the path movement according to FIG. 3, the actual positional value $\underline{X}_I$ is situated four travel sections behind the setpoint positional value $\underline{X}_S$. From this, it is apparent that the path parameter $F_I$ required to trigger a switching function must be able to serve as a comparison within the individual travel sections, so that a uniform value can be found through the four preceding travel sections. For instance, if the path parameter $F_I$ in the travel section CP1 were indicated in Cartesian coordinates, then it would no longer be possible to continue the path parameter value $F_I$ in the following loop block UE1, since, as already explained, the Cartesian coordinates are not known for this loop block. The same applies to the following blocks PTP and UE2. Therefore, the numerical control calculates a one-dimensional and actual-value-specific path parameter $F_I$, which is able to be used as a comparison within the various travel sections and whose value rises or falls monotonically within a single travel section.

The continuity condition must be adhered to so that no ambiguities arise within a travel section. Thus, for instance, the path parameter $F_I$ could be assigned the value zero at the beginning $\underline{X1}$ of the travel section CP1, and the value 100 at the end $\underline{X2}$ of travel section CP1. In travel section UE1, the path parameter $F_I$ could increase from the value 100 to the value 150 at position $\underline{X3}$, for example. The values of the path parameter at positions $\underline{X4}$, $\underline{X5}$ and $\underline{X6}$ could be assigned the values $F_I = 220$, $\overline{260}$ and $\overline{340}$, respectively.

The path parameter $F_I$ could also be set at the beginning of a travel section. For example, the value 100 could be assigned at position $\underline{X1}$ and the path parameter $F_I$ could monotonically decrease to the value zero at position $\underline{X2}$. The value of the path parameter $F_I$ in the case of a new travel section also does not necessarily have to begin with the same value as that of the path parameter $F_I$ at the end of the preceding travel section. As mentioned above, the most important criterion for the path parameter is that it be able to be used as a comparison throughout the various travel sections.

A one-dimensional path parameter $F_I$ can be derived from a motional function $F_B(t)$ of the numerically controlled system. In each case, the motional function which defines the time of motion, is applied.

Figure 4:
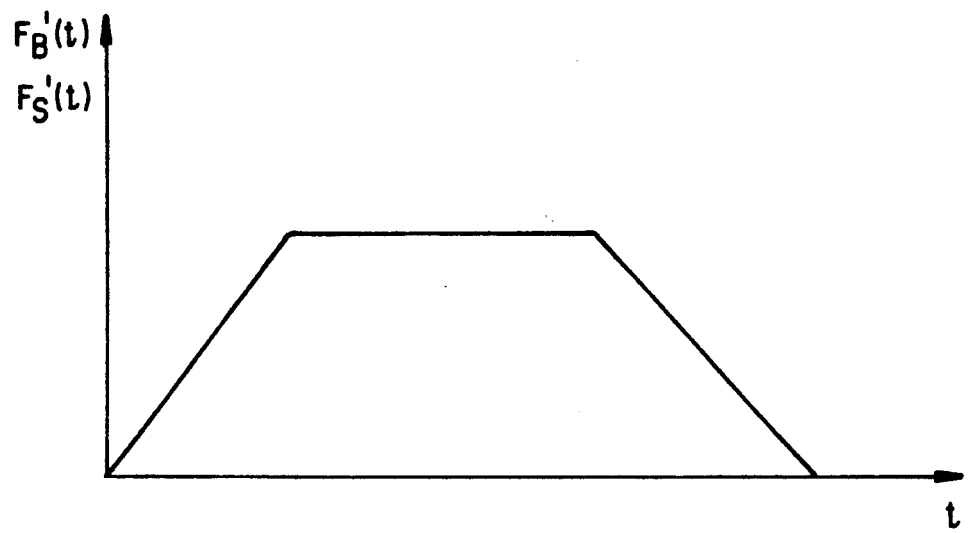
FIG. 4 illustrates a feedrate profile of a motional function.
Figure 5:
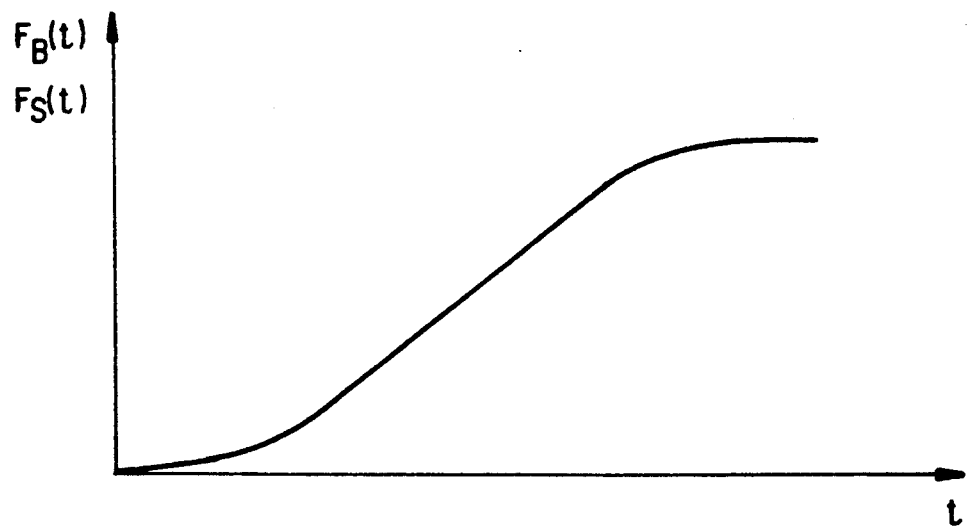
FIG. 5 illustrates the profile of a motional function.

FIG. 4 illustrates the feedrate profile $F_B'(t) = dF_B(t)/dt$ of a motional function. In the case of CP movements, it is directly proportional to the path feedrate. The numerical control calculates this feedrate profile for each travel section. The course of the path parameter $F_B(t)$ depicted in FIG. 5 is obtained by integrating the feedrate function $F_B'(t)$.

In the case of CP movements, the vector $\underline{X}_S$ of the travel components is calculated from one single motional function $F_B(t)$ according to equation (1).

$$\underline{X}_S = (X, Y, Z, A, B, C)^T = \underline{G}_S(F_B(t)) \quad (1)$$

$\underline{G}_S$ is the vector of the geometric functions which calculate the travel components.

At this point, the scaled motional function is used as a setpoint path parameter $F_S$ according to Equation (2).

$$F_S(t) = K \cdot F_B(t) \quad (2)$$

The scaling factor K enables $F_S$ to be scaled so that it can be used as a comparison through all travel sections.

In the case of PTP movements, the travel components correspond to the setpoint angles $a_{IS}$ of the axis $I = 1 \ldots n$. The setpoint angles are calculated from one or more motional functions. The motional function $F_B(t)$, which defines the travel time, is drawn upon according to equation (2) to calculate the setpoint path parameter.

FIG. 4 illustrates the profile of the feedrate of the setpoint path parameter $F_S'(t)$ and FIG. 5 illustrates the profile of the setpoint path parameter $F_S(t)$.

When the delay time $T_{ea}$ between the setpoint angles $a_{IS}$ and the actual angles $a_{II}$ is known, the actual path parameter $F_I(t)$ can be determined using a first-order time-delay element of the time constants $T_{ea}$. If $F_S(t)$ is known analytically, then $F_I$ can be determined according to Equation (3).

$$F_I(t) = F_S(t - T_{ea}) \quad (3)$$

If $T_{ea}$ is not known, $F_I(t)$ can be approximated fairly well from Equations (4) and (5).

$$\Delta F = \frac{dF_S}{dt} \cdot (a_{SI} - a_{II})/(da_{IS}/dt) \quad (4)$$

To evaluate Equation (4), it is preferable to draw upon the axis I having the greatest setpoint feedrate $da_{IS}/dt$.

If the setpoint feedrate ($da_{IS}/dt$) is constant, $T_{ea}$ is able to be determined according to Equation (6).

$$T_{ea} = (a_{SI} - a_{II})/(da_{IS}/dt) \quad (6)$$

The actual path parameter is now calculated at every instant by the numerical control and can be displayed on a display unit or other indicating device, for example, while the robot is taught. At a specific position $\underline{X}$, the user can read off the value of the path parameter $\overline{F}_I$ and enter it into the numerical control for the scheduled operation. The switching operation is then triggered in the scheduled operation when the specified value of the actual path parameter is reached.

If the switching operation is supposed to be triggered by a time $T_V$ before the actual path parameter is reached, then at the instant t, the value of the actual path parameter have at instant $t + T_V$ is predicted with $$F_I(t + T_V) = F_S(t - T_{ea} + T_V)$$

and the switching operation is then triggered when the predicted actual path parameter has reached the specified value.

If the switching operation is supposed to be triggered by a time $T_d$ after the actual path parameter is reached, then the output of the switching operation is to be delayed by the time $T_d$ after the specified value is reached.

What is claimed is:

1. A method for triggering a switching operation during a machining process carried out by a numerically controlled robot or a numerically controlled machine tool along a trajectory path including a plurality of travel sections, numerical control of said numerically controlled robot or numerically controlled machine tool calculating setpoint values of travel components from at least one motional function $F_B(t)$ for each of the plurality of travel sections, the method comprising the steps of:

deriving from one or more of the at least one motional function $F_B(t)$ a path parameter $F_I(t)$, which is specific to an actual value, wherein different actual values of the path parameter $F_I(t)$ correspond to different positions of the robot or tool such that the actual value of the path parameter rises or falls monotonically from a starting position to an end position for each of said travel sections; and triggering the switching operation when the derived path parameter has reached a predetermined actual value corresponding to a predetermined position of the robot or tool along one of said travel sections.

2. The method according to claim 1, further comprising the step of displaying the value of the actual path parameter of the numerically controlled robot or of the numerically controlled machine tool.

3. The method according to claim 1, wherein the current value of the path parameter at a position $\underline{X}$ that is approached when the numerically controlled robot or the numerically controlled machine tool is taught is automatically retrieved in response to an input by an operator.

4. The method according to claim 1, wherein the switching operation is triggered at a specifiable period of time T before or after the predetermined actual value of the path parameter is reached.

5. The method according to claim 1, further comprising the step of deriving a setpoint path parameter $F_S(t)$ from a motional function of one travel section according to the relation:

$$F_S(t) = K \cdot F_B(t)$$

whereby the factor K enables a specific travel section to be scaled allowing the setpoint path parameter $F_B(t)$ to be used as a comparison value for various ones of said plurality of travel sections.

6. The method according to claim 5, wherein the actual path parameter $F_I(t)$ is obtained from the equation:

$$F_I(t) = F_S(t) - \Delta F;$$

wherein $$\Delta F = (dF_S/dt) \cdot \Delta a_I / (da_{IS}/dt)$$

wherein $\Delta a_I$ is the difference between the setpoint and actual angle of an axis of said numerically controlled robot or numerically controlled machine tool and $da_{IS}/dt$ is the setpoint feedrate.

7. The method according to claim 5, wherein the actual path parameter $F_I(t)$ is calculated from the setpoint path parameter $F_B(t)$ by a first-order time-delay element with a time constant $T_{ea} = \Delta a_I / (da_{IS}/dt)$.

8. The method according to claim 5, wherein the actual path parameter $F_I(t)$ is calculated from the relation $$F_I(t) = F_S(t - T_{ea})$$

and $T_{ea}$ is a time delay between the setpoint and actual angles.

9. The method according to claim 5, wherein a displacement of the switching operation by a specifiable period of time T is able to be triggered with $$F_I(t+T) = F_S(t - T_{ea} + T)$$

before the predetermined actual value of the path parameter is reached.

10. The method according to claim 1, wherein said switching operation includes application of an adhesive by a glue gun mounted on said numerically controlled robot or said numerically controlled machine tool.

11. The method according to claim 1, wherein said numerically controlled robot or numerically controlled machine tool is a welding or bonding tool.

* * * * *

UNITED STATES PATENT AND TRADEMARK OFFICE
CERTIFICATE OF CORRECTION

PATENT NO. : 5,287,049
DATED : February 15, 1994
INVENTOR(S) : Jürgen Olomski et al.

It is certified that error appears in the above-indentified patent and that said Letters Patent is hereby corrected as shown below:

TITLE PAGE

[73] Assignee: should read

--Siemens Aktiengesellschaft, Munchen, Fed. Rep. of Germany and
  KUKA Schweissanlagen & Roboter GmbH, Augsburg, Fed. Rep. of Germany--.